United States Patent
Yoshino et al.

(10) Patent No.: US 12,040,716 B2
(45) Date of Patent: Jul. 16, 2024

(54) DC/DC CONVERTER WITH PARALLEL CONVERTERS AND SWITCHING CONTROL PERFORMED USING PHASES DIFFERENT AMONG THE CONVERTERS

(71) Applicant: Mitsubishi Electric Corporation, Tokyo (JP)

(72) Inventors: Hiroyuki Yoshino, Tokyo (JP); Tomokazu Sakashita, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 233 days.

(21) Appl. No.: 17/642,704

(22) PCT Filed: Nov. 21, 2019

(86) PCT No.: PCT/JP2019/045620
§ 371 (c)(1),
(2) Date: Mar. 14, 2022

(87) PCT Pub. No.: WO2021/100170
PCT Pub. Date: May 27, 2021

(65) Prior Publication Data
US 2022/0329159 A1    Oct. 13, 2022

(51) Int. Cl.
H02M 3/158    (2006.01)
H02M 1/00    (2006.01)

(52) U.S. Cl.
CPC ....... *H02M 3/1586* (2021.05); *H02M 1/0048* (2021.05)

(58) Field of Classification Search
CPC .... H02M 1/0048; H02M 1/0054; H02M 1/44; H02M 3/1586
See application file for complete search history.

(56) References Cited

U.S. PATENT DOCUMENTS

| 2013/0241621 A1 | 9/2013 | Forghani-Zadeh et al. |
| 2016/0036317 A1 | 2/2016 | Shimomugi et al. |
| 2016/0363317 A9 | 2/2016 | Shimomugi et al. |

FOREIGN PATENT DOCUMENTS

| DE | 11 2015 002 622 T5 | 2/2017 |
| JP | 2007-195282 A | 8/2007 |

(Continued)

OTHER PUBLICATIONS

International Search Report and Written Opinion mailed on Feb. 10, 2020, received for PCT Application PCT/JP2019/045620, Filed on Nov. 21, 2019, 13 pages including English Translation.
(Continued)

*Primary Examiner* — Kyle J Moody
*Assistant Examiner* — Jye-June Lee
(74) *Attorney, Agent, or Firm* — XSENSUS LLP

(57) ABSTRACT

A DC/DC converter includes N converters connected in parallel and each having an inductor, a switching element, and a reverse-flow preventing element. Each converter is controlled at phases different from each other and such that a sum of switching frequencies F is out of a first non-selected frequency band. The inductor has an inductance that decreases as the switching frequency F increases. The switching element is controlled using the switching frequency F higher than a second non-selected frequency band of which upper and lower limit frequencies are 1/N of upper and lower limit frequencies of the first non-selected frequency band, and has a total gate charge such that a total loss is smaller than that in a case where the switching frequency F is set to be lower than the second non-selected frequency band.

20 Claims, 15 Drawing Sheets

(56) References Cited

FOREIGN PATENT DOCUMENTS

| | | | |
|---|---|---|---|
| JP | 2010-207068 A | | 9/2010 |
| JP | 2010207068 A | * | 9/2010 |
| JP | 2011-101554 A | | 5/2011 |
| JP | 2012-70527 A | | 4/2012 |
| JP | 2012-147641 A | | 8/2012 |
| JP | 2012147641 A | * | 8/2012 |
| JP | 2015-511112 A | | 4/2015 |
| JP | 2015-213402 A | | 11/2015 |
| JP | 2017-135766 A | | 8/2017 |
| WO | 2014/167727 A1 | | 10/2014 |
| WO | 2015/186404 A1 | | 12/2015 |
| WO | WO-2015186404 A1 | * | 12/2015 .......... H02M 3/1584 |

OTHER PUBLICATIONS

Notice of Reasons for Refusal mailed on Aug. 4, 2020, received for JP Application 2020-536818, 11 pages including 2 English Translation.

Office Action issued Feb. 10, 2023 in German Patent Application No. 11 2019 007 909.3, 9 pages.

Notice of Reasons for Refusal mailed on Aug. 4, 2020, received for JP Application 2020-536818, 11 pages including English Translation.

* cited by examiner

DC/DC CONVERTER WITH PARALLEL CONVERTERS AND SWITCHING CONTROL PERFORMED USING PHASES DIFFERENT AMONG THE CONVERTERS

CROSS-REFERENCE TO RELATED APPLICATION

The present application is based on PCT filing PCT/JP2019/045620, filed Nov. 21, 2019, the entire contents of which is incorporated herein by reference.

TECHNICAL FIELD

The present disclosure relates to a DC/DC converter.

BACKGROUND ART

For the purpose of reducing noise due to harmonic current, a conventional DC/DC converter is proposed as follows.

A power supply device as the conventional DC/DC converter includes a plurality of current paths branching after full-wave rectification of an AC power supply, a plurality of inductors provided to the respective current paths, a DC voltage generation unit which generates DC voltage by supplying output currents from the plurality of inductors to a common capacitance element, and a switching unit for controlling currents flowing through the plurality of inductors. The switching unit performs control through switching using phases different among the plurality of inductors. With this configuration, a current path is branched into a plurality of paths and the current values in the respective current paths become small, whereby current in each switching transistor can be reduced. Further, since the switching phases are shifted from each other, a ripple component of a merged current value of currents flowing through the plurality of inductors can be reduced, whereby harmonic current as noise can be reduced (see, for example, Patent Document 1).

CITATION LIST

Patent Document

Patent Document 1: Japanese Laid-Open Patent Publication No. 2007-195282

SUMMARY OF THE INVENTION

Problems to be Solved by the Invention

The conventional DC/DC converter is an interleaved DC/DC converter in which a plurality of converters having inductors and switching transistors and forming current paths are connected in parallel and switching control is performed using phases different among the converters. In this case, the sum of switching frequencies increases in accordance with the number of the converters, and there is a concern about noise interference with a broadcast band, e.g., an amplitude modulation (AM) radio. In particular, a DC/DC converter for on-vehicle application is required to avoid noise interference with an on-vehicle radio device (AM radio).

However, in view of circuit loss and heat generation in the DC/DC converter, the sum of switching frequencies is set to be lower than the broadcast band, thus causing a problem that the sizes of peripheral components, in particular, inductors, are enlarged.

The present disclosure has been made to solve the above problem, and an object of the present disclosure is to provide a DC-DC converter that can reduce noise due to harmonic current and that, while avoiding a specific frequency band, can suppress circuit loss and heat generation and can facilitate size reduction.

Solution to the Problems

A DC/DC converter according to the present disclosure includes: N converters each having an inductor, a switching element, and a reverse-flow preventing element, the N converters being connected in parallel; and a control unit for performing switching control for the switching element of each of the converters using a set switching frequency, to control the N converters. The control unit controls the converters at phases different from each other and such that a sum of the switching frequencies is out of a predetermined first non-selected frequency band. In each of the converters, the inductor has an inductance that decreases as the switching frequency increases, and total loss of loss in the inductor and loss in the switching element changes in accordance with the switching frequency. In at least one of the N converters, the switching element is controlled using the switching frequency set to be higher than a second non-selected frequency band of which upper and lower limit frequencies are 1/N of upper and lower limit frequencies of the first non-selected frequency band, respectively, and the switching element has such a small total gate charge that the total loss is smaller than that in a case where the switching frequency is set to be lower than the second non-selected frequency band.

Effect of the Invention

In the DC/DC converter according to the present disclosure, noise due to harmonic current can be reduced. In addition, while the first non-selected frequency band is avoided, circuit loss and heat generation can be suppressed and size reduction can be facilitated.

DESCRIPTION OF EMBODIMENTS

Embodiment 1

Figure 1:
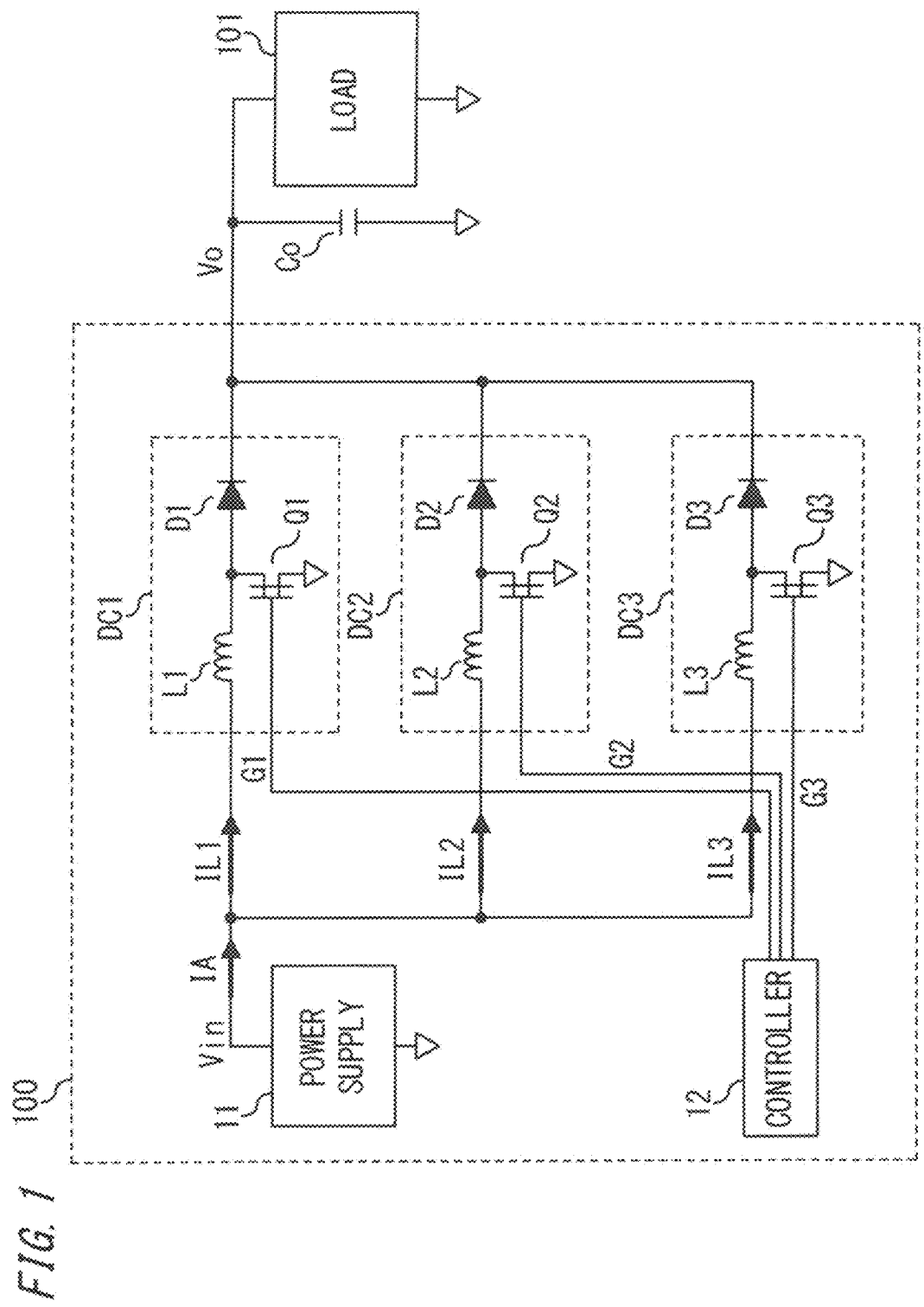
FIG. 1 is a diagram showing a schematic configuration of a DC/DC converter according to embodiment 1.

FIG. 1 is a diagram showing a schematic configuration of a DC/DC converter according to embodiment 1.

As shown in FIG. 1, a DC/DC converter 100 includes N converters DCk (k=1 to N) connected in parallel on each of the input side and the output side. Each converter DCk is formed as a boost chopper circuit having an inductor Lk, a switching element Qk, and a diode Dk as a reverse-flow preventing element.

It is noted that N is plural and in this example, is 3. That is, three converters DC1, DC2, DC3 respectively having inductors L1, L2, L3, switching elements Q1, Q2, Q3, and diodes D1, D2, D3 are connected in parallel.

Further, the DC/DC converter 100 includes an input voltage generation source (hereinafter, power supply 11) for generating input voltage Vin, and a controller 12 as a control unit for controlling each converter DCk by performing switching control for each switching element Qk at phases different from each other. The DC/DC converter 100 boosts the input voltage Vin and supplies DC power which is output voltage Vo to a load 101 via an output capacitor Co.

The output capacitor Co is provided as a filter for preventing the output voltage Vo from greatly varying in a short period of time. The output capacitor Co may be connected to the output side of each converter DCk.

Thus, the DC/DC converter 100 is an interleaved DC/DC converter in which a plurality of converters DCk are connected in parallel and switching control is performed using phases different among the converters DCk.

Each switching element Qk is, for example, a self-turn-off switching element such as a metal oxide semiconductor field effect transistor (MOSFET) or an insulated gate bipolar transistor (IGBT).

The controller 12 is formed by, for example, a calculation processing circuit such as a central processing unit (CPU) or a field programmable gate array (FPGA), and generates and outputs control signals for performing pulse width modulation (PWM) control for the switching elements Qk, in this case, gate signals Gk (G1, G2, G3).

Figure 2:
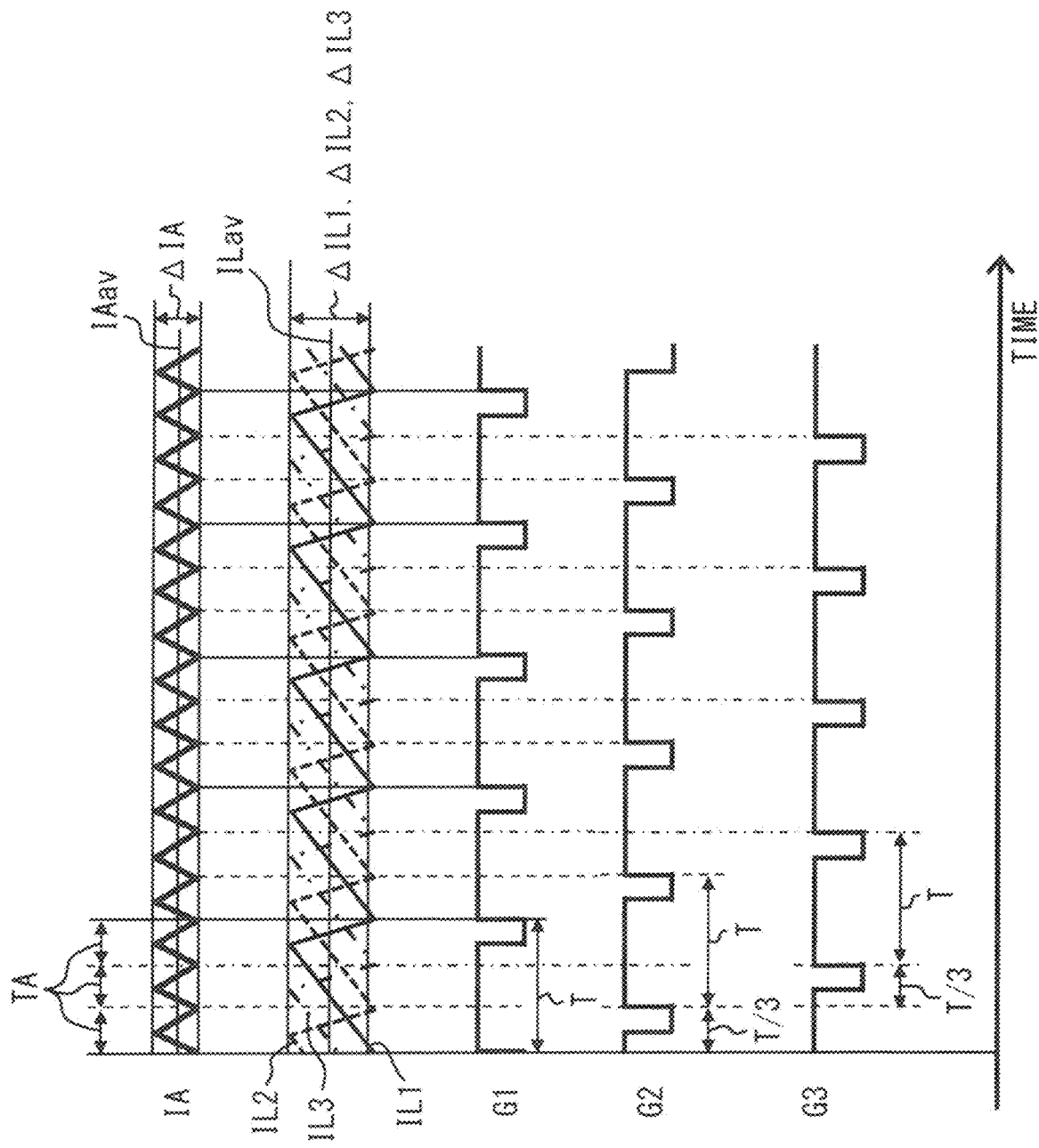
FIG. 2 is a waveform diagram for each part, illustrating operation of the DC/DC converter according to embodiment 1.

FIG. 2 is a waveform diagram for each part, illustrating operation of the DC/DC converter 100.

FIG. 2 shows the gate signals G1, G2, G3 for the respective switching elements Q1, Q2, Q3, inductor currents IL1, IL2, IL3 flowing through the respective inductors L1, L2, L3, and input current IA inputted from the power supply 11. The input current IA is equal to the sum of the inductor currents IL1, IL2, IL3.

In this case, the switching elements Qk of the respective converters DCk are controlled at an equal switching frequency F, and the gate signals Gk are PWM signals having an equal cycle T (=1/F) and phases shifted from each other by $(2\pi/N)$. That is, the phases of the gate signals G1, G2, G3 are different from each other by T/3.

Each inductor current ILk (IL1, IL2, IL3) has such a triangular current waveform that increases when the switching element Qk is ON and decreases when the switching element Qk is OFF. Average currents ILav and amplitudes ΔILk (ΔIL1, ΔIL2, ΔIL3) of these inductor currents ILk are substantially equal to each other.

The input current IA which is the sum of the inductor currents IL1, IL2, IL3 has such a triangular current waveform that varies at a total frequency FA which is the sum of the respective switching frequencies F. In this case, since the switching elements Qk are controlled at an equal switching frequency F with their phases shifted from each other by $(2\pi/3)$, the total frequency FA is substantially three times the switching frequency F, and a cycle TA (=1/FA) is substantially (⅓) times the switching cycle T.

Average current IAav of the input current IA is substantially three times the average current ILav of each inductor current ILk, and an amplitude ΔIA of the input current IA is substantially (⅓) times the amplitude ΔILk of each inductor current ILk.

As described above, the amplitude ΔIA of the input current IA which is the sum of the inductor currents IL1, IL2, IL3 is reduced. Thus, the amplitude of harmonic current due to switching in the DC/DC converter 100 can be reduced, whereby it becomes possible to reduce noise due to harmonic current. In addition, the average current IAav of the input current IA is distributed into the average currents ILav of the inductors Lk, and in particular, in a case where the output power is large, conversion efficiency of the DC/DC converter 100 can be improved.

In a case where the DC/DC converter 100 configured and controlled as described above is used for, for example, on-vehicle application, avoidance of noise interference with an on-vehicle radio device (AM radio) is required as described above. The broadcast frequency band of the AM radio is approximately 526.5 kHz to 1606.5 kHz, and is close to a switching frequency band generally used in a DC/DC converter.

Figure 3:
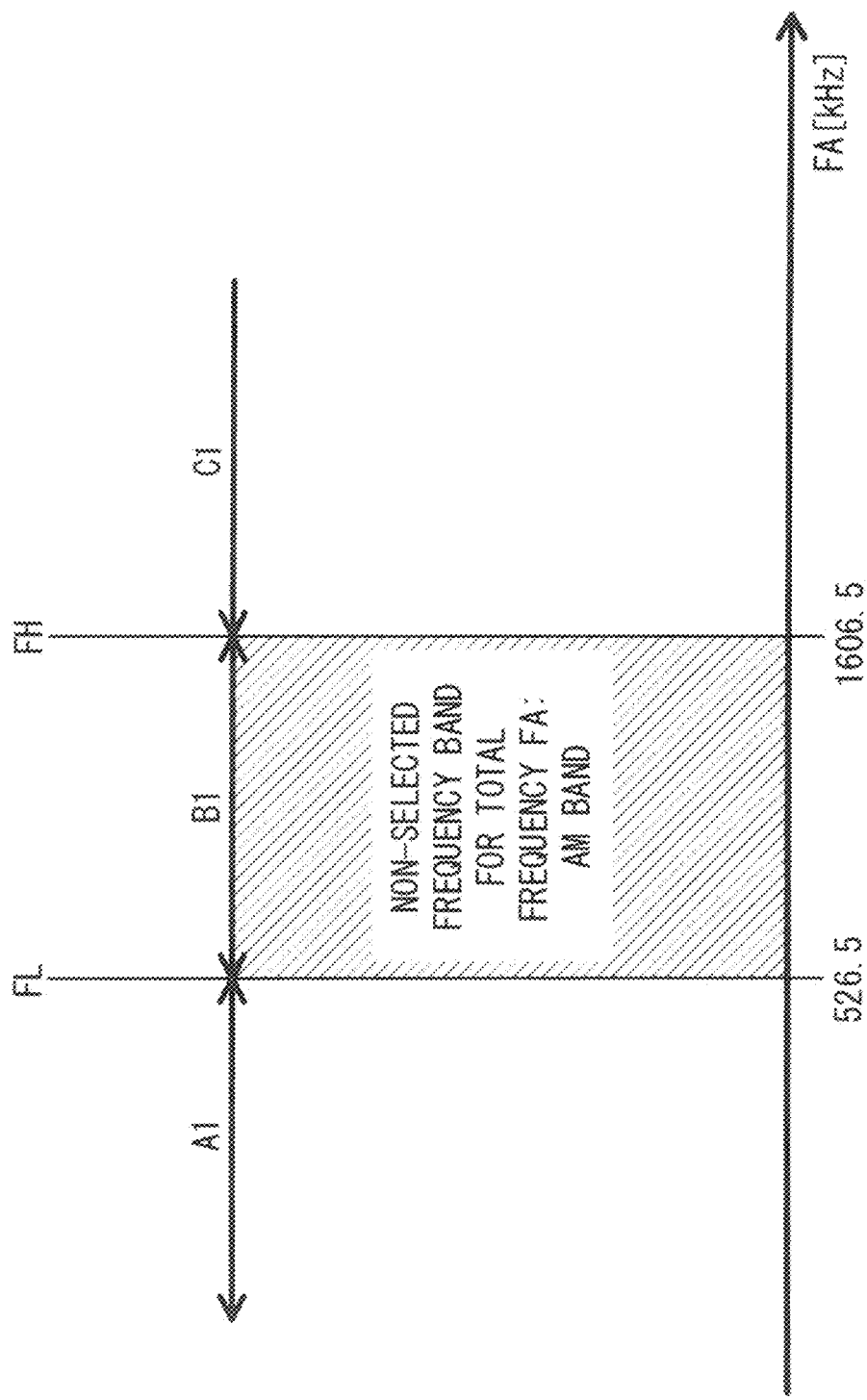
FIG. 3 shows the range of a total frequency according to embodiment 1.

FIG. 3 shows the range of the total frequency FA of the DC/DC converter 100.

In the DC/DC converter 100, the switching frequency F for each switching element Qk is set such that the total frequency FA is out of an AM radio broadcast frequency band (hereinafter, referred to as AM band B1) as a first non-selected frequency band. That is, the total frequency FA is set outside the AM band B1 having an upper limit frequency FH and a lower limit frequency FL, and in a lower frequency band A1 than the AM band B1 or a higher frequency band C1 than the AM band B1.

In the present embodiment, the total frequency FA is set in the higher frequency band C1, and the switching elements Qk are controlled at the equal switching frequency F.

Figure 4:
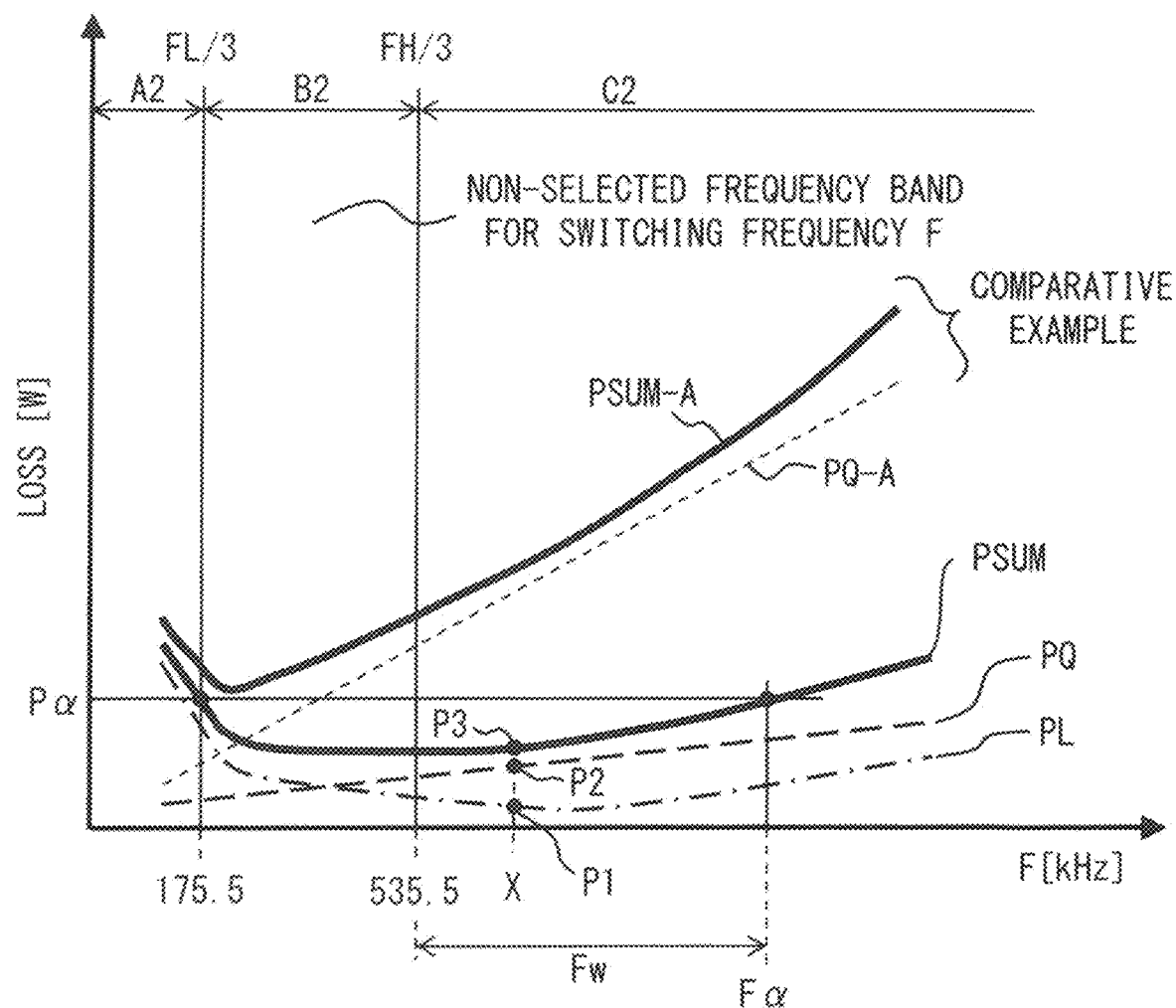
FIG. 4 shows characteristics of circuit loss with respect to a switching frequency according to embodiment 1, together with a comparative example.

FIG. 4 shows characteristics of circuit loss with respect to the switching frequency, together with a comparative example. Here, a case of using an on-vehicle battery as the power supply 11 is shown.

The circuit loss in each converter DCk is represented by total loss PSUM of loss PL in the inductor Lk and loss PQ in the switching element Qk.

In the present embodiment, the switching element Qk has a total gate charge Qg smaller than that of a generally used switching element, e.g., has a total gate charge Qg of about 25 nC or smaller. On the other hand, in the comparative example, a switching element that has been widely used conventionally and has a total gate charge Qg of, for example, about 50 nC or greater, is used, and loss PQ-A of the switching element and total loss PSUM-A of the loss PQ-A and the loss PL in the inductor Lk are shown.

In each converter DCk, the switching frequency F for the switching element Qk is set in a frequency band C2 higher than a non-selected band B2 as a second non-selected frequency band of which an upper limit FH/3 (about 535.5 kHz) and a lower limit FL/3 (about 175.5 kHz) are 1/N (in this case, ⅓) of the upper limit frequency FH and the lower limit frequency FL of the AM band B1, respectively.

The inductor Lk in each converter DCk has a small inductance that does not become lower than a lower limit value, and the inductance decreases as the switching frequency F increases.

The inductance of the inductor Lk is referred to as inductance Lk, for simplification.

A lower limit value infLk of the inductance Lk is determined by voltage VLk applied across the inductor Lk, a maximum ripple width ΔILmax determined by the average value (average current) ILav and a limitation value ILlim of the inductor current ILk, the switching frequency F, and the duty cycle D, and is represented by the following Expression (1).

$$infLk = (VLk/\Delta ILmax) \cdot D \cdot (1/F) \quad (1)$$

The voltage VLk applied across the inductor Lk is equal to the input voltage Vin. The limitation value ILlim of the inductor current ILk is, for example, a specification value set so that a noise level due to harmonic current components is kept below a prescribed value, or a saturation current value of the inductor Lk. In this case, the limitation value ILlim is equal among the inductors Lk. However, the limitation value ILlim may be different among the inductors Lk.

FIG. 4 shows characteristics in a case where the inductance Lk is set at the lower limit value infLk.

As shown in FIG. 4, in the switching element Qk, as the switching frequency F increases, the switching loss increases, so that the loss PQ increases. In this case, since the total gate charge Qg is small, the loss PQ is smaller as compared to the loss PQ-A in the comparative example, and thus the slope at which the loss PQ increases with increase in the switching frequency F can be significantly reduced.

In the inductor Lk, loss PL occurs by a combination of copper loss due to a resistance component, iron loss caused in a core, a skin effect, and the like. As described above, the inductor Lk has the inductance Lk that decreases as the switching frequency F increases. Therefore, in a low frequency region, copper loss is dominant, and as the switching frequency F increases, copper loss decreases and the loss PL also decreases. As the frequency further increases, iron loss increases and loss due to the skin effect is also added, so that the loss PL switches from decrease to increase.

When the switching frequency F becomes higher than the frequency band A2, the total loss PSUM (=PQ+PL) becomes smaller than a minimum value Pα in the frequency band A2, and a region Fw in which the total loss PSUM is smaller than Pα is present in the frequency band C2 higher than the non-selected band B2.

In the present embodiment, the switching frequency F is set in the frequency band C2 higher than the non-selected band B2, and in particular, set in the region Fw in which the total loss PSUM (=PQ+PL) is smaller than the minimum value Pa in the frequency band A2 lower than the non-selected band B2. Where the switching frequency at which the total loss PSUM is Pa in the frequency band C2 higher than the non-selected band B2 is denoted by Fa, the region Fw is (FH/3) to Fα.

For example, where the switching frequency F is X in the region Fw, the total loss PSUM (=P3) of the loss PL (=P1) in the inductor Lk and the loss PQ (=P2) in the switching element Qk is smaller than Pα. That is, the total loss PSUM is smaller than that in a case where the switching frequency F is set to be lower than the non-selected band B2.

In the comparative example, the loss PQ-A in the switching element is great and also the increase rate of the loss PQ-A with respect to increase in the switching frequency F is great, so that the total loss PSUM-A is also great similarly. Therefore, in the comparative example, a region in which the total loss PSUM-A is smaller than the minimum value thereof in the frequency band A2 cannot be provided in the frequency band C2, that is, there is no region corresponding to the region Fw.

As described above, in the present embodiment, the switching element Qk having a small total gate charge Qg is used for the converter DCk, whereby the region Fw in which the total loss PSUM (=PQ+PL) is smaller than the minimum value Pα in the frequency band A2 lower than the non-selected band B2 is provided in the frequency band C2, and the switching frequency F in the region Fw is used.

Figure 5:
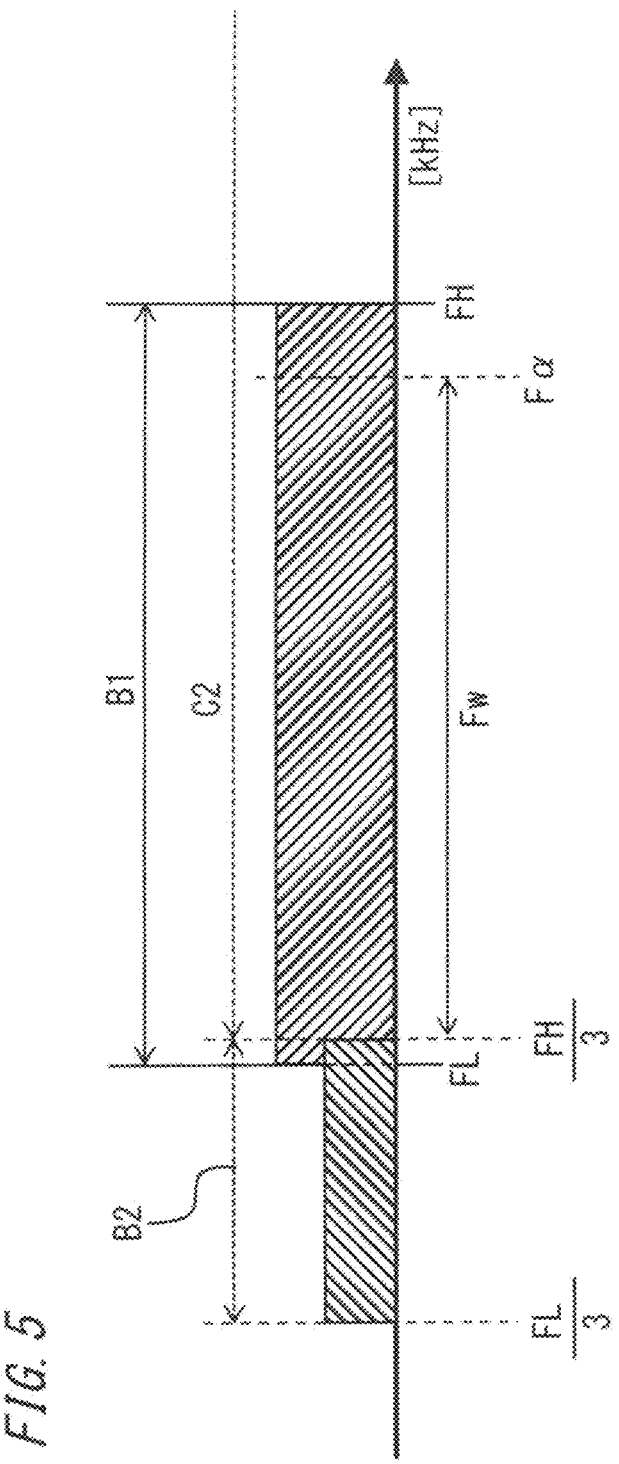
FIG. 5 illustrates a region of a switching frequency according to embodiment 1.

FIG. 5 illustrates the region of the switching frequency F.

As shown in FIG. 5, the region Fw is a region that is within the AM band B1 and includes a center part of the AM band B1. Using such characteristics, the switching frequency F may be set at a center part in the AM band B1 in advance, and thus it is possible to easily set the switching frequency F in the region Fw.

Figure 6:
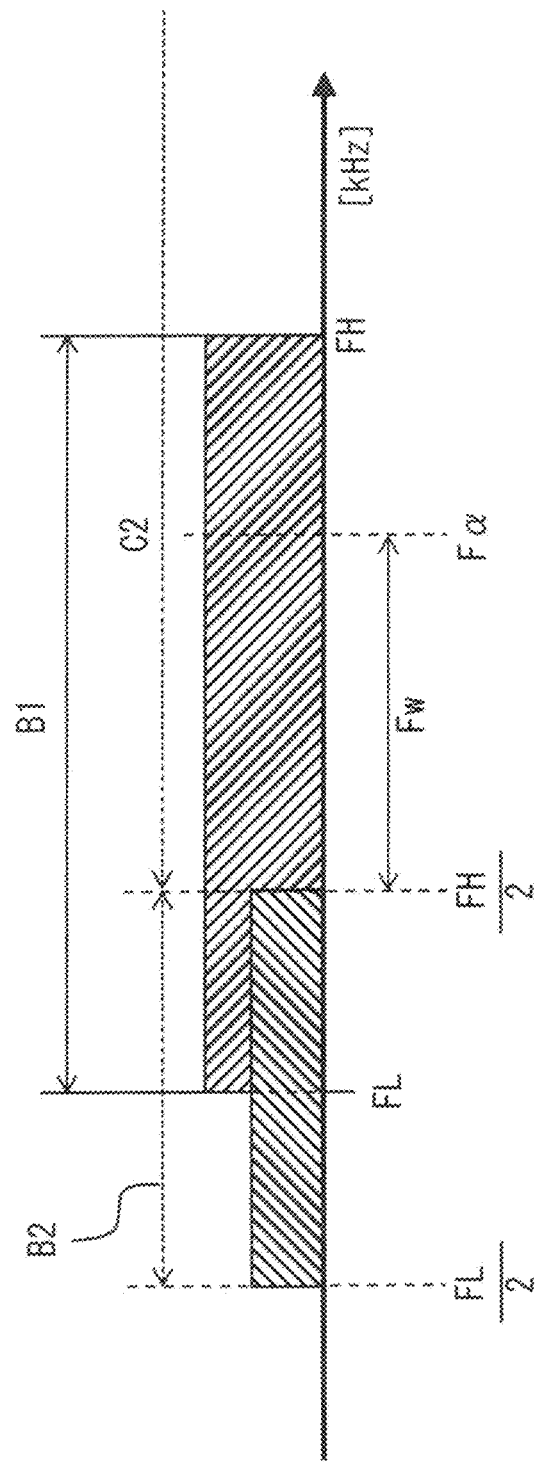
FIG. 6 illustrates a region of a switching frequency according to another example of embodiment 1.
Figure 7:
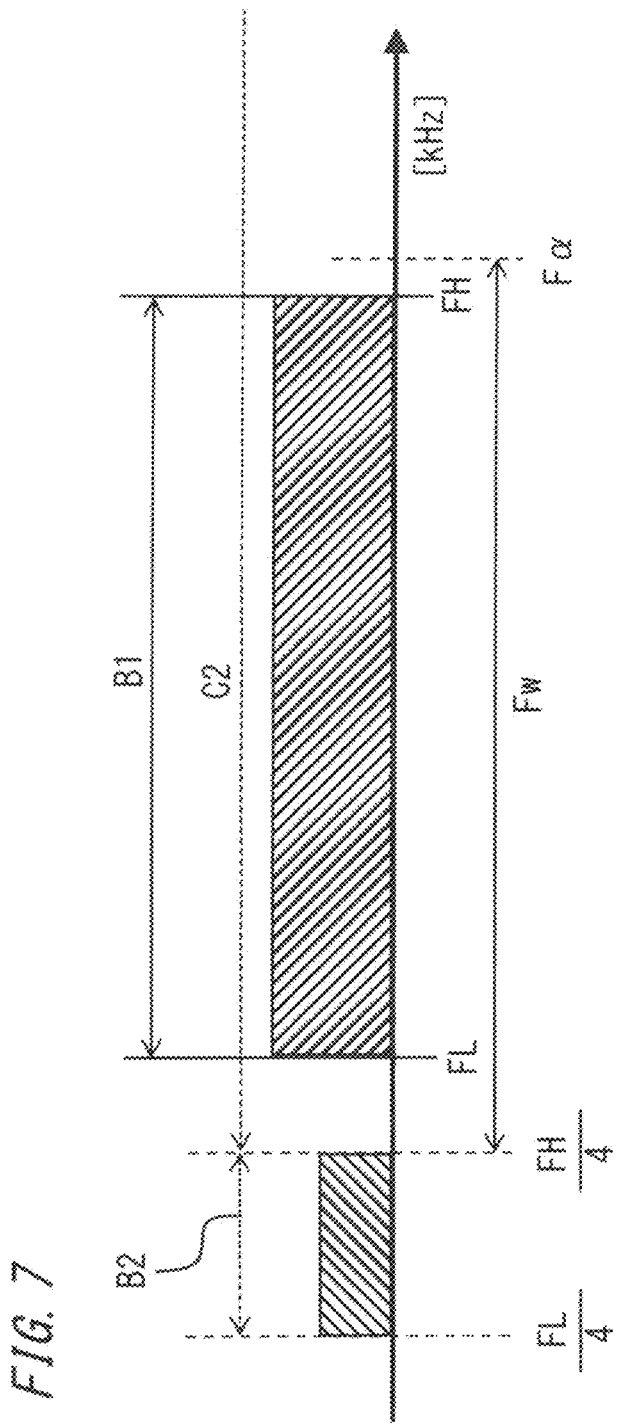
FIG. 7 illustrates a region of a switching frequency according to another example of embodiment 1.

The relationship between the region Fw and the AM band B1 changes in accordance with the number N of the converters DCk. FIG. 6 and FIG. 7 show the relationship for cases of N=2 and N=4, respectively. In either case, the region Fw is a region that includes a center part of the AM band B1, and thus it is possible to set the switching frequency F at a center part in the AM band B1 in advance.

The total gate charge Qg is not limited to the above value, as long as the region Fw in which the total loss PSUM is smaller than the minimum value Pα in the frequency band A2 can be provided in the frequency band C2 and the switching frequency F can be set in the region Fw.

That is, in each converter DCk, the inductor Lk has an inductance that decreases as the switching frequency increases, and control is performed using the switching frequency F set in the frequency band C2, and the total gate charge Qg of the switching element Qk is set small such that the total loss PSUM becomes smaller than that in the case where the switching frequency F is set in the frequency band A2.

As described above, in each converter DCk, the total loss PSUM can be reduced using the switching frequency F in the frequency band C2 higher than the non-selected band B2, and size reduction of the inductor Lk and reduction in the total loss PSUM can be both achieved. Thus, circuit loss and heat generation in the DC/DC converter 100 are suppressed and size reduction thereof can be facilitated.

In addition, each converter DCk is controlled using the switching frequency F in the frequency band C2 higher than the non-selected band B2 of which upper and lower limit frequencies are 1/N of the upper limit frequency FH and the lower limit frequency FL of the AM band B1. Thus, in the DC/DC converter 100, the total frequency FA can easily and assuredly avoid the AM band B1.

In a case of using an on-vehicle battery as the power supply 11, the Typical value thereof is about 12 V, but it is necessary to consider variation between about 6 V and 19 V, including instantaneous variation. Thus, in the case where the variation width of the input voltage Vin is large, as the input voltage Vin decreases, the average current IAav of the input current IA increases, and the average current ILav of each inductor current ILk also increases. In this case, if the switching frequency F is high and thus the inductance Lk becomes small, copper loss is further reduced, and therefore the effect of reducing the total loss PSUM can be enhanced.

In addition, since each converter DCk is formed as a boost chopper circuit which is a boost converter, when the average current ILav of each inductor current ILk is increased, if the switching frequency F is high and thus the inductance Lk becomes small, copper loss is further reduced and the effect of reducing the total loss PSUM can be enhanced.

In addition, the inductance Lk is determined on the basis of the lower limit value infLk. Therefore, the inductance Lk that decreases as the switching frequency F increases can be easily and assuredly determined.

The switching element Qk may be formed by a Si semiconductor, or instead, a wide bandgap semiconductor such as GaN or SiC. In a case where the switching element Qk is formed by a wide bandgap semiconductor, the total gate charge Qg is small and the loss PQ of the switching element Qk is small. Thus, the total loss PSUM can be effectively reduced in a region where the switching frequency F is high.

In the above embodiment, the N converters DCk are configured in the same manner and controlled at an equal switching frequency F. However, without limitation thereto, for at least one converter DCk, the switching element Qk having a small total gate charge Qg may be used, and control may be performed using the switching frequency F in the frequency band C2 at which the total loss PSUM is smaller than the minimum value Pa in the frequency band A2. Thus, the total loss PSUM in the converter DCk can be reduced and the inductor Lk can be downsized, thereby contributing to suppression of circuit loss and heat generation in the DC/DC converter 100 and size reduction thereof.

In this case, the total frequency FA of the DC/DC converter 100 may be in the lower frequency band A1 as long as the total frequency FA is out of the AM band B1.

In the above embodiment, the total frequency FA is determined so as to avoid the AM band B1. However, the above configuration can be applied in the same manner also for a case of avoiding a frequency band other than the AM band B1, as the first non-selected frequency band.

In the above embodiment, the inductance Lk is set at, for example, the lower limit value infLk, in accordance with the switching frequency F. However, an existing inductor product having a known inductance may be used.

There are various inductor products, which have inductance values of 1 µH, 1.5 µH, 2.2 µH, 3.3 µH, 4.7 µH, 6.8 µH, 10 µH, 15 µH, 22 µH, . . . , for example. Among these inductor products, an inductor having a small inductance that does not become lower than the lower limit value infLk can be used as the inductor Lk.

Figure 8:
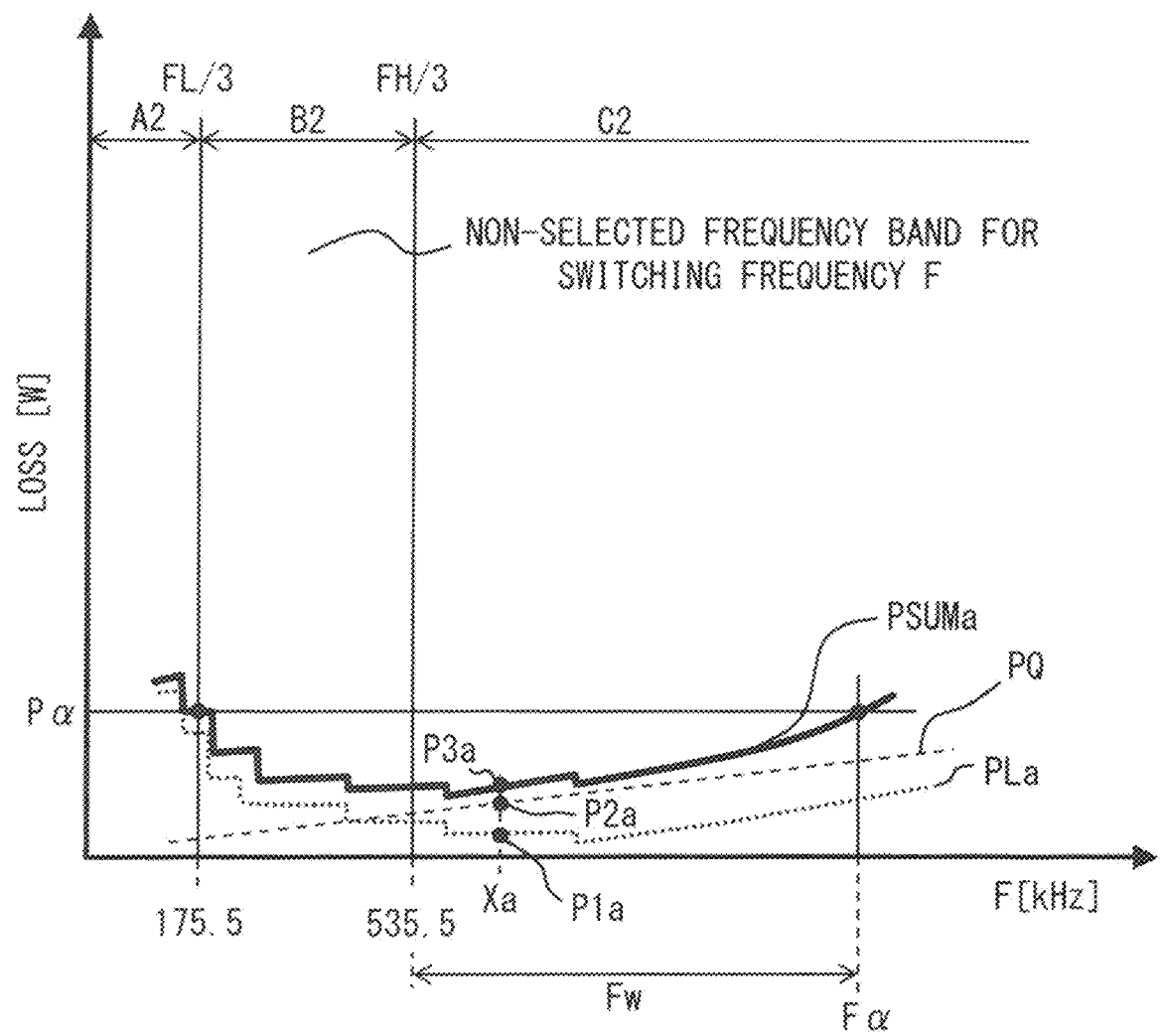
FIG. 8 shows characteristics of circuit loss according to another example of embodiment 1.

FIG. 8 shows characteristics of circuit loss with respect to the switching frequency in the converter DCk using an existing inductor product. The circuit loss in each converter DCk is represented by total loss PSUMa of loss PLa in the inductor Lk and loss PQ in the switching element Qk. Here, the same switching element Qk as in the case shown in FIG. 4 is used.

In this case, the inductance decreases stepwise with increase in the switching frequency. Therefore, the loss PLa in the inductor Lk and the total loss PSUMa also change stepwise, but they change with a tendency similar to the case shown in FIG. 4. That is, when the switching frequency F becomes higher than the frequency band A2, the total loss PSUMa becomes smaller than the minimum value Pa in the frequency band A2, and the region Fw in which the total loss PSUMa is smaller than Pa is present in the frequency band C2 higher than the non-selected band B2. Then, the switching frequency F to be used for control is set in the region Fw. Where the switching frequency at which the total loss PSUMa is Pa in the frequency band C2 higher than the non-selected band B2 is denoted by Fa, the region Fw is (FH/3) to Fa.

For example, where the switching frequency F is Xa in the region Fw, the total loss PSUMa (=P3a) of the loss PLa (=P1a) in the inductor Lk and the loss PQ (=P2a) in the switching element Qk is smaller than Pα. That is, the total loss PSUMa is smaller than that in a case where the switching frequency F is set to be lower than the non-selected band B2.

Also in this case, the total loss PSUMa in each converter DCk can be reduced and the inductor Lk can be downsized. Therefore, as in the above embodiment, it is possible to suppress circuit loss and heat generation in the DC/DC converter 100 and facilitate size reduction thereof. In addition, each converter DCk can be easily formed using an existing inductor product.

A plurality of existing inductor products may be combined in series and/or parallel to form an inductor Lk having a desired inductance.

Embodiment 2

Figure 9:
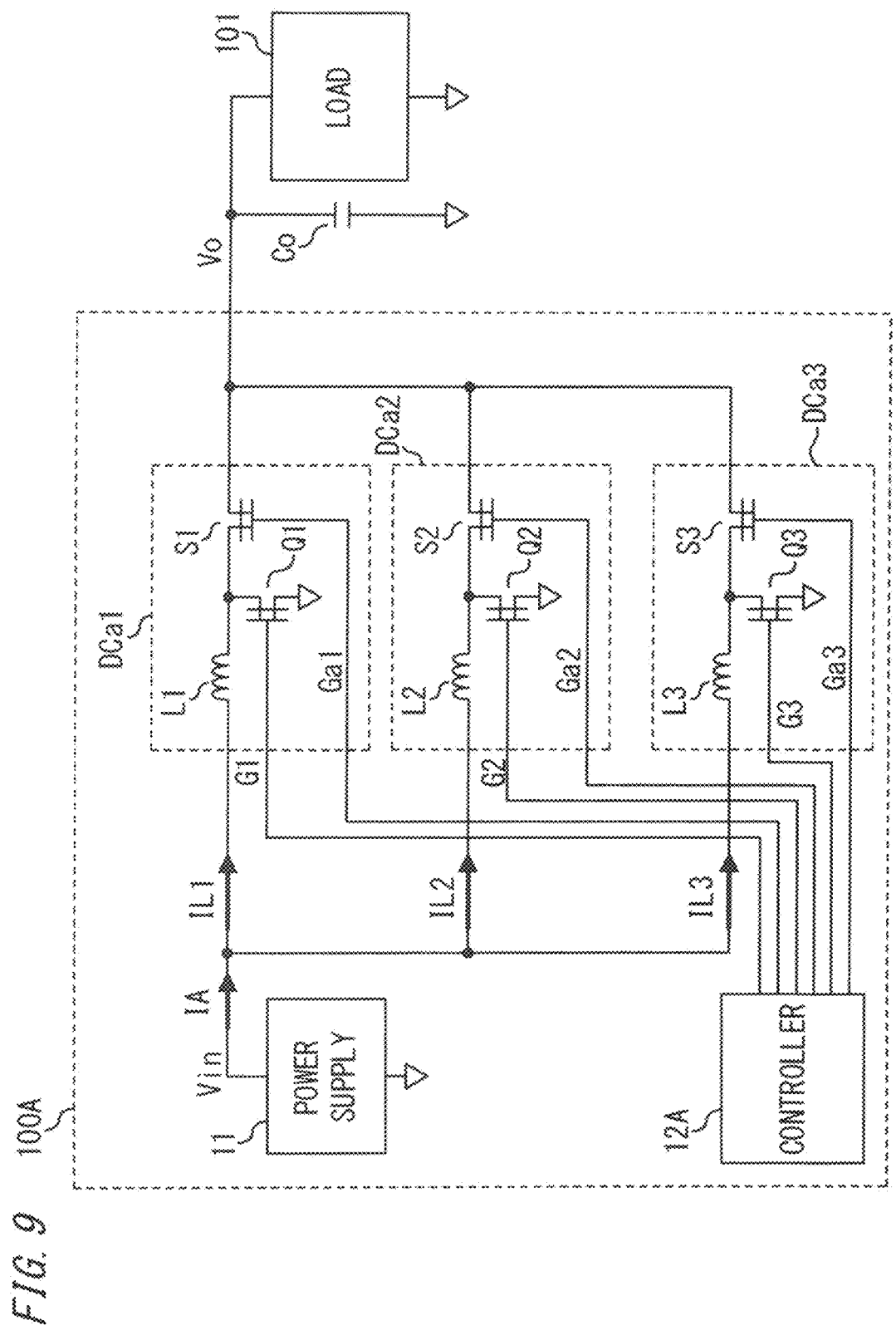
FIG. 9 is a diagram showing a schematic configuration of a DC/DC converter according to embodiment 2.

FIG. 9 is a diagram showing a schematic configuration of a DC/DC converter according to embodiment 2.

As shown in FIG. 9, a DC/DC converter 100A includes N converters DCak (k=1 to N) connected in parallel on each of the input side and the output side. Each converter DCak is formed as a boost chopper circuit having the inductor Lk, the switching element Qk, and a switching element Sk as a reverse-flow preventing element. It is noted that N is plural and in this example, is 3. That is, three converters DCa1, DCa2, DCa3 are connected in parallel.

In embodiment 2, the switching element Sk is used as the reverse-flow preventing element in each converter DCak, and a controller 12A as the control unit performs switching control for the switching elements Qk and the switching elements Sk. The other configurations are the same as in the above embodiment 1.

Each switching element Sk is a self-turn-off switching element such as a MOSFET or an IGBT, as with the switching element Qk.

The controller 12A generates the gate signals Gk to perform switching control for the switching elements Qk at phases different from each other, and generates gate signals Gak (Ga1, Ga2, Ga3) which are PWM signals in which ON and OFF are inverted from the gate signals Gk, to perform switching control for the switching elements Sk. A dead time is provided for the gate signals Gk and Gak so that the switching element Qk and the switching element Sk are not turned on at the same time.

Also in the present embodiment, in each converter DCak, the inductor Lk and the switching element Qk similar to those in the above embodiment 1 are used, and control is performed using the switching frequency F similar to that in the above embodiment 1.

That is, the inductance of the inductor Lk is set to be small on the basis of the lower limit value infLk in accordance with the switching frequency F, and the switching element Qk having a small total gate charge Qg is used. The switching frequency F is set in the frequency band C2 higher than the non-selected band B2, and in particular, set in the region Fw in which the total loss PSUM (=PQ+PL) is smaller than the minimum value Pa in the frequency band A2 lower than the non-selected band B2.

Thus, as in the above embodiment 1, in each converter DCak, the total loss PSUM can be reduced using the switching frequency F in the frequency band C2 higher than the non-selected band B2, and size reduction of the inductor Lk and reduction in the total loss PSUM can be both achieved. Thus, in the DC/DC converter 100A, the total frequency FA can easily and assuredly avoid the AM band B1, circuit loss and heat generation are suppressed, and size reduction can be facilitated.

In the present embodiment, the switching element Sk is also controlled using the same switching frequency F as for the switching element Qk, and loss in the switching element Sk varies in accordance with the switching frequency F. Therefore, it is desirable that an element having a small total gate charge Qg is used also for the switching element Sk and loss in the switching element Sk is also added in the total loss PSUM to be used as a basis for determining the switching frequency F.

Embodiment 3

Figure 10:
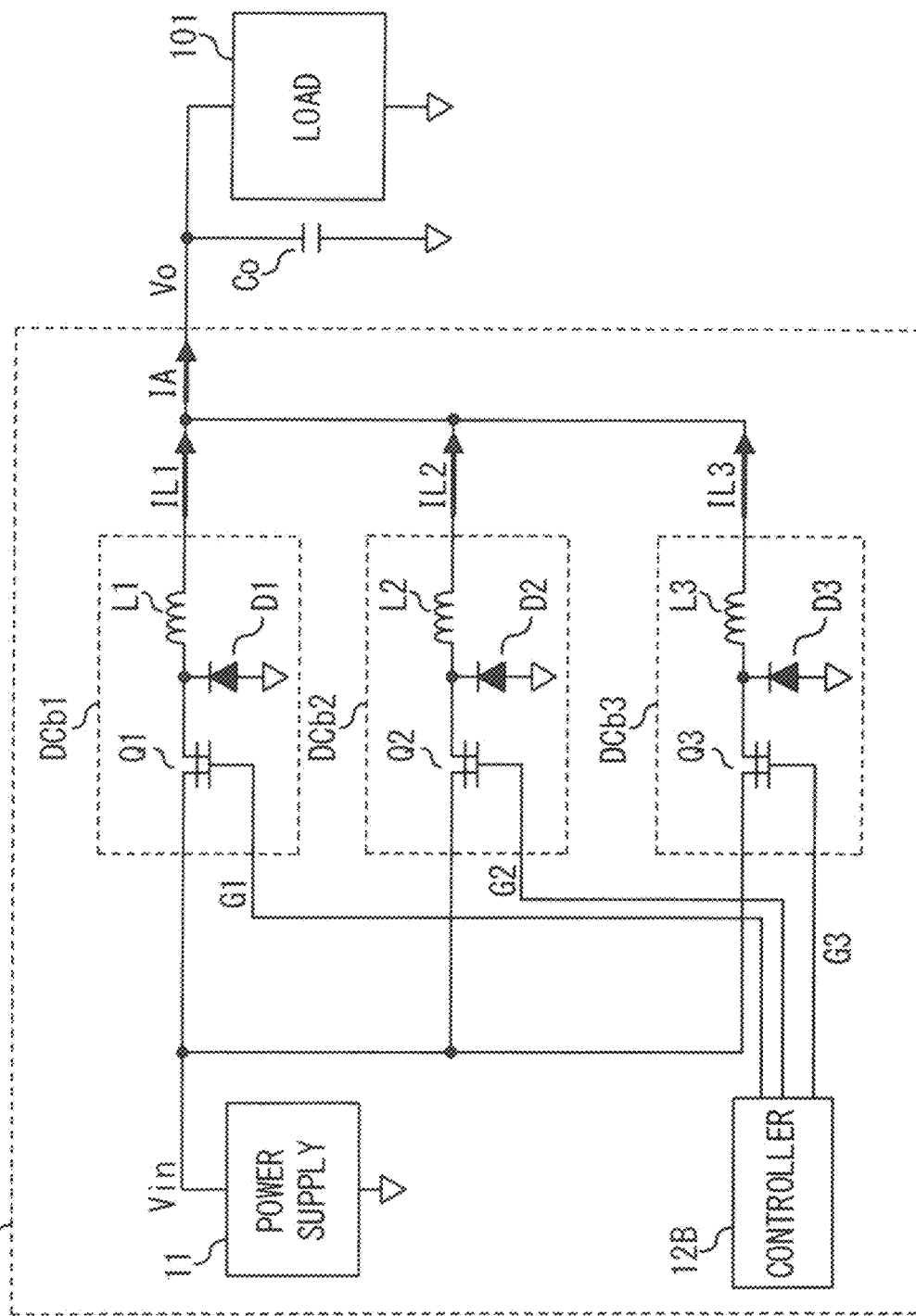
FIG. 10 is a diagram showing a schematic configuration of a DC/DC converter according to embodiment 3.

FIG. 10 is a diagram showing a schematic configuration of a DC/DC converter according to embodiment 3.

As shown in FIG. 10, a DC/DC converter 100B includes N converters DCbk (k=1 to N) connected in parallel on each of the input side and the output side. Each converter DCbk is formed as a step-down chopper circuit having the inductor Lk, the switching element Qk, and the diode Dk as a reverse-flow preventing element. It is noted that N is plural and in this example, is 3. That is, three converters DCb1, DCb2, DCb3 are connected in parallel to each other.

A controller 12B as the control unit controls the converters DCbk by performing switching control for the switching elements Qk at phases different from each other, to step down the input voltage Vin and supply DC power which is the output voltage Vo to the load 101 via the output capacitor Co.

The other configurations are the same as in the above embodiment 1.

In the present embodiment, each converter DCbk is formed as a step-down chopper circuit which is a step-down converter, the inductor current ILk flowing through each inductor Lk is output current from the converter DCbk, and the sum of the inductor currents IL1, IL2, IL3 is outputted as the output current IA from the DC/DC converter 100B.

The inductor Lk in each converter DCbk has a small inductance that does not become lower than the lower limit value, and the inductance decreases as the switching frequency F increases.

Also in this case, the lower limit value infLk of the inductance Lk is represented by Expression (1) shown in the above embodiment 1. The voltage VLk applied across the inductor Lk is difference voltage (Vin−Vo) between the input voltage Vin and the output voltage Vo.

Also in the present embodiment, in each converter DCbk, the inductor Lk and the switching element Qk similar to those in the above embodiment 1 are used, and control is performed using the switching frequency F similar to that in the above embodiment 1.

That is, the inductance of the inductor Lk is set to be small on the basis of the lower limit value infLk in accordance with the switching frequency F, and the switching element Qk having a small total gate charge Qg is used. The switching frequency F is set in the frequency band C2 higher than the non-selected band B2, and in particular, set in the region Fw in which the total loss PSUM (=PQ+PL) is smaller than the minimum value Pa in the frequency band A2 lower than the non-selected band B2.

Thus, as in the above embodiment 1, in each converter DCak, the total loss PSUM can be reduced using the switching frequency F in the frequency band C2 higher than the non-selected band B2, and size reduction of the inductor Lk and reduction in the total loss PSUM can be both achieved. Thus, in the DC/DC converter 100B, the total frequency FA can easily and assuredly avoid the AM band B1, circuit loss and heat generation are suppressed, and size reduction can be facilitated.

Also in the present embodiment, the above embodiment 2 may be applied, i.e., the switching element Sk may be used as a reverse-flow preventing element.

Each converter is not limited to that shown in the above embodiments 1, 2, and may be a buck-boost converter, Cuk converter, a Zeta converter, a Sepic converter, or the like.

Embodiment 4

In the above embodiment 1, each converter DCk is controlled with the switching frequency F set to a fixed value, whereas in the present embodiment 4, the switching frequency F is used in a temporally varied manner.

Figure 11:
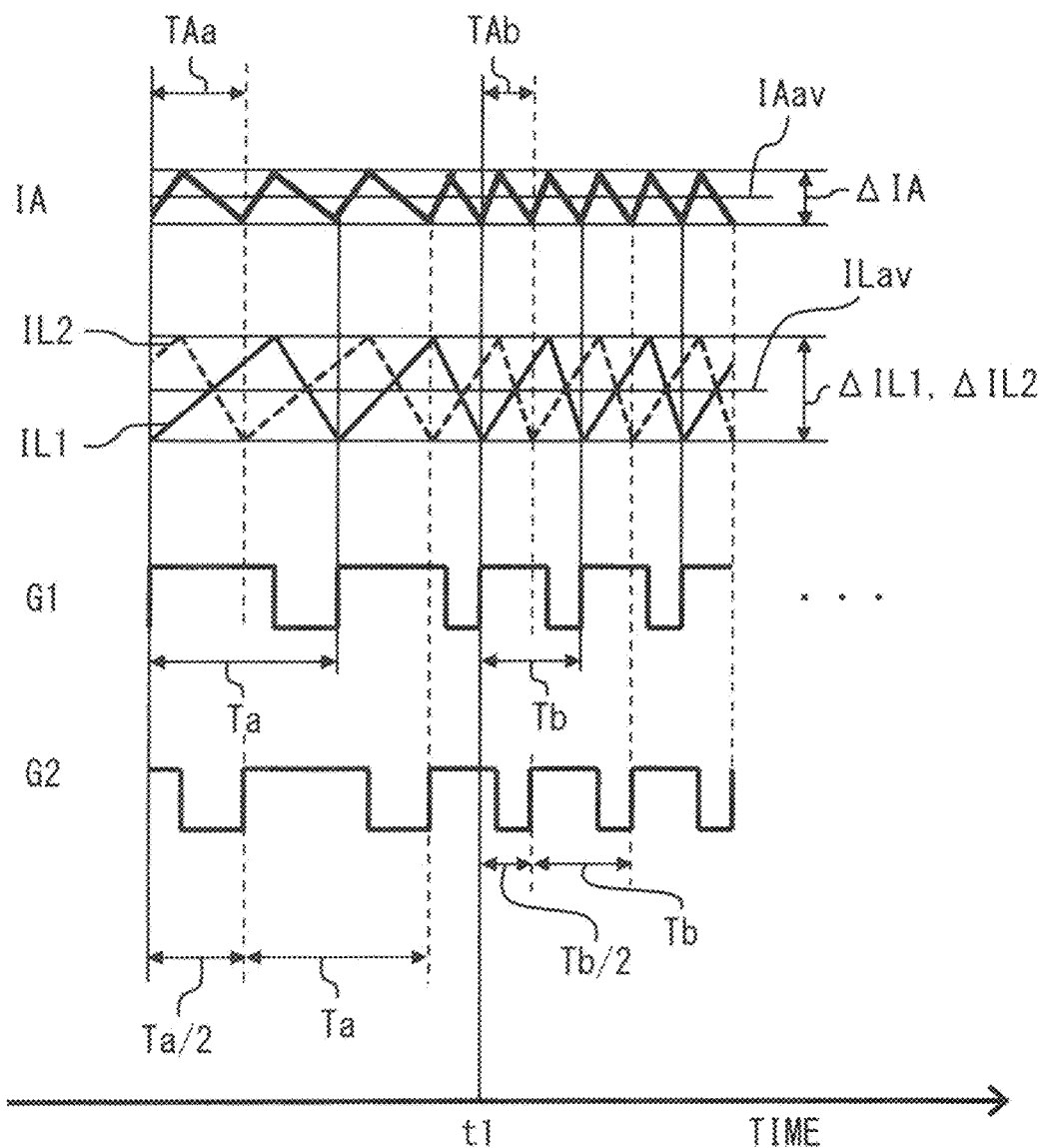
FIG. 11 is a waveform diagram for each part, illustrating operation of a DC/DC converter according to embodiment 4.

FIG. 11 is an operation waveform diagram illustrating operation of the DC/DC converter according to embodiment 4. Here, an example in which the DC/DC converter 100 has two converters DCk connected in parallel is shown.

As shown in FIG. 11, for the switching elements Qk (Q1, Q2), at time t1, the switching frequency F is switched from Fa to Fb, i.e., a switching cycle T is switched from Ta (=1/Fa) to Tb (=1/Fb). The two switching elements Qk are controlled with their phases shifted from each other by π. Therefore, in a region in which the switching cycle T is Ta, switching is performed with a difference of (Ta/2), and in a region in which the switching cycle T is Tb, switching is performed with a difference of (Tb/2).

The input current IA which is the sum of the inductor currents IL1, IL2 has a triangular current waveform that varies at a total frequency FA which is the sum of the respective switching frequencies F. That is, in a region in which the switching cycle T is Ta, the input current IA varies at a cycle TAa that is substantially ½ of Ta, and in a region in which the switching cycle T is Tb, the input current IA varies at a cycle TAb that is substantially ½ of Tb.

Here, a case where the switching frequency F is changed at time t1 has been described. However, the switching frequency F may be changed among three or more values at predetermined time intervals.

In addition, the inductance Lk is set so as to satisfy the lower limit value infLk of inductance calculated in accordance with the lowest one of the plurality of switching frequencies F, i.e., set to a small value that does not become lower than the lower limit value infLk. Further, the plurality of switching frequencies F are selected and temporally varied, in the region Fw in which the total loss PSUM (=PQ+PL) is smaller than the minimum value Pa in the frequency band A2.

Also in the present embodiment, as in the above embodiment 1, the inductance of the inductor Lk is set to be small on the basis of the lower limit value infLk in accordance with the switching frequency F, and the switching element Qk having a small total gate charge Qg is used. The switching frequency F is set in the frequency band C2 higher than the non-selected band B2, and in particular, set in the region Fw in which the total loss PSUM (=PQ+PL) is smaller than the minimum value Pa in the frequency band A2 lower than the non-selected band B2.

Thus, as in the above embodiment 1, in each converter DCk, the total loss PSUM can be reduced using the switching frequency F in the frequency band C2 higher than the non-selected band B2, and size reduction of the inductor Lk and reduction in the total loss PSUM can be both achieved. Thus, in the DC/DC converter 100, the total frequency FA can easily and assuredly avoid the AM band B1, circuit loss and heat generation are suppressed, and size reduction can be facilitated.

In addition, since a plurality of switching frequencies F are used in a temporally varied manner, the amplitude ΔIA of the current IA which is the sum of the inductor currents ILk is further reduced and noise components due to the switching frequencies F are distributed, whereby noise due to harmonic current based on switching in the DC/DC converter 100 can be further reduced.

Desirably, the region in which the switching frequency F is temporally varied among a plurality of values is within the region Fw in which the total loss PSUM is smaller than the minimum value Pa, but as long as the average value is within the region Fw, the effects of size reduction of the inductor Lk and reduction in the total loss PSUM are obtained. Description will be given below with reference to FIG. 12.

Figure 12:
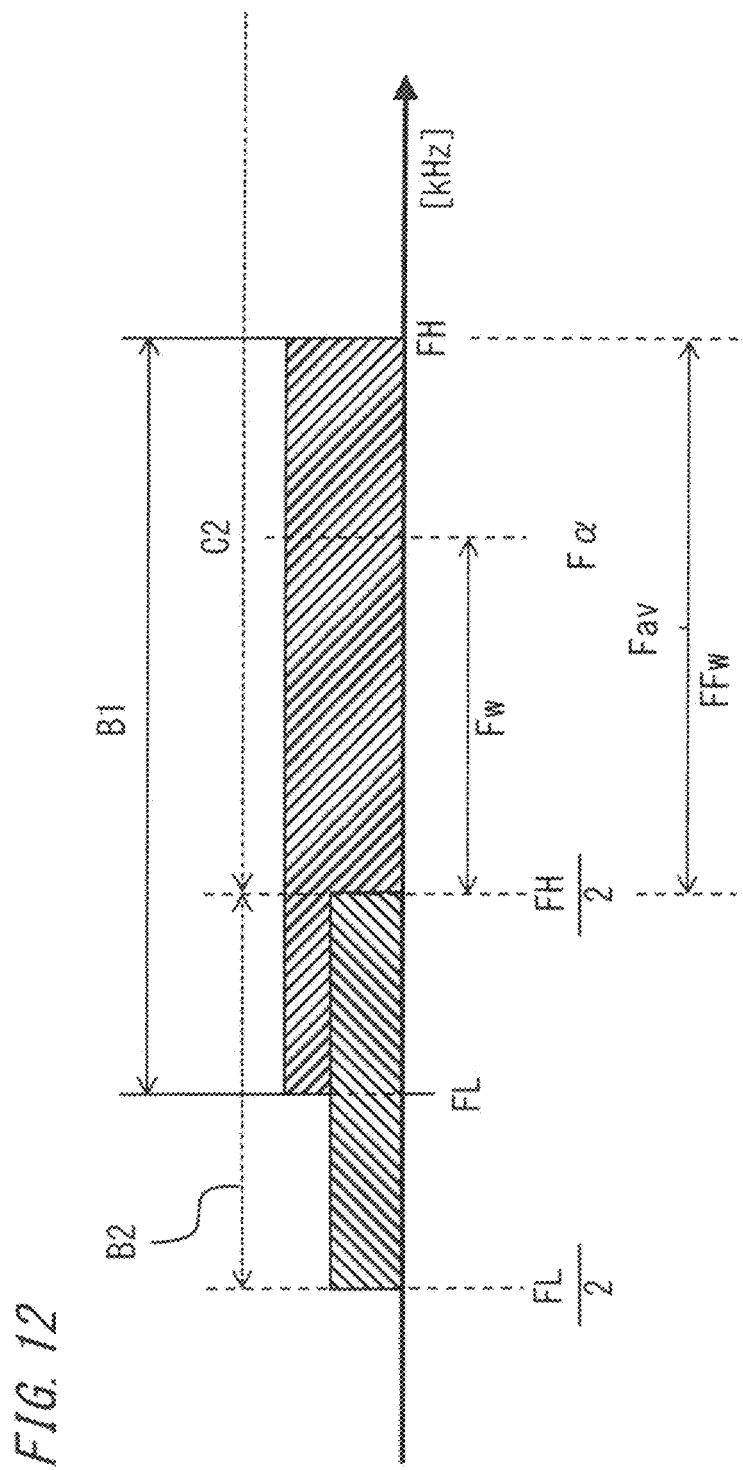
FIG. 12 illustrates a variation region of a switching frequency according to another example of embodiment 4.

As shown in FIG. 12, since the region Fw is a region that is within the AM band B1 and includes a center part of the AM band B1, the switching frequency F is varied in a region FFw that is in the frequency band C2 higher than the non-selected band B2 and in the AM band B1. It is noted that the switching frequency F is varied so that an average value Fav of the switching frequency F is in the region Fw.

Since the region FFw is set to be (FH/2) to FH in advance, the switching frequency F can be easily set.

Figure 13:
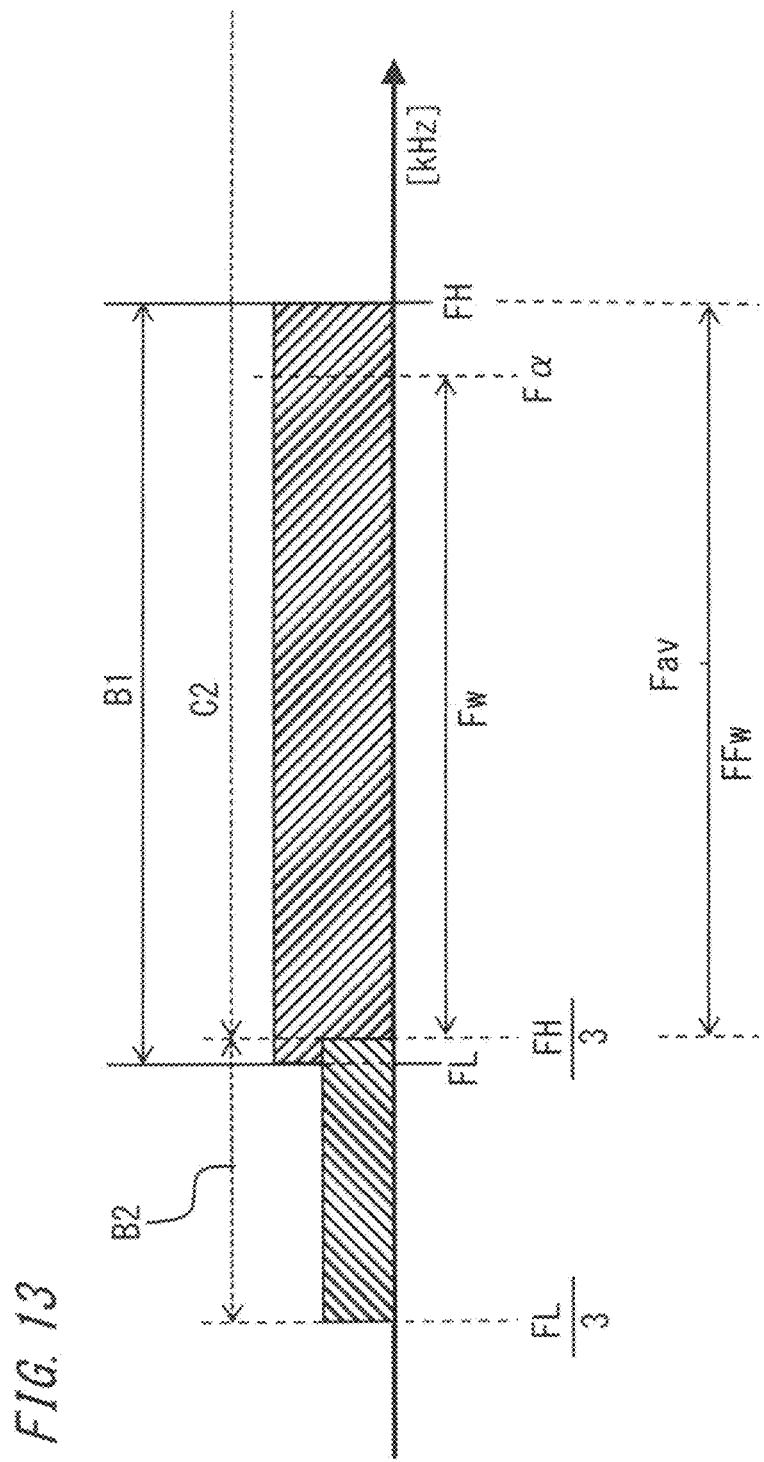
FIG. 13 illustrates a variation region of a switching frequency according to another example of embodiment 4.
Figure 14:
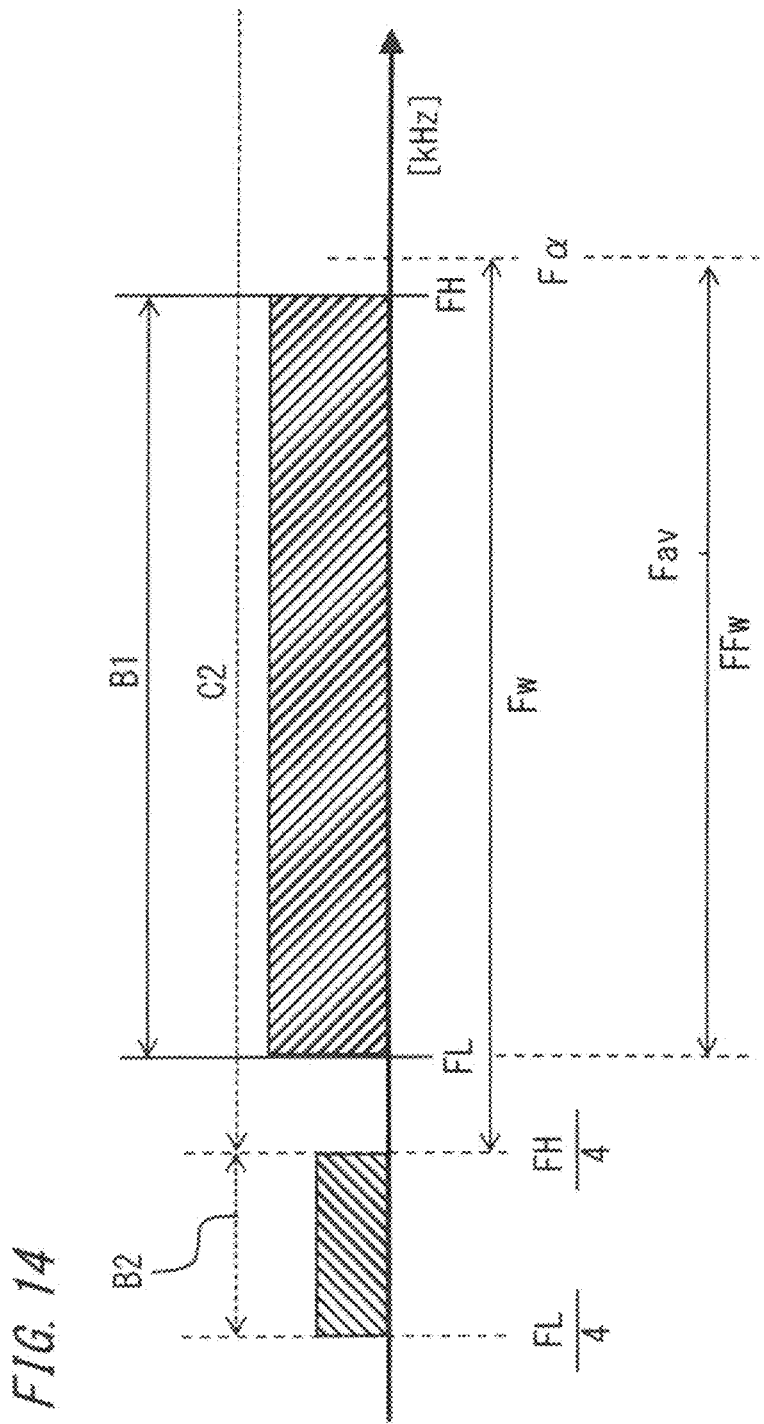
FIG. 14 illustrates a variation region of a switching frequency according to another example of embodiment 4.

The relationship between the region FFw and the AM band B1 changes in accordance with the number N of the converters DCk. FIG. 13 and FIG. 14 show cases of N=3 and N=4, respectively. In either case, the region Fw is a region including a center part of the AM band B1, and the switching frequency F is varied in the region FFw that is in the frequency band C2 higher than the non-selected band B2 and in the AM band B1. In particular, in the case of N=4, the region FFw coincides with the AM band B1. In addition, the average value Fav of the switching frequency F is in the region Fw.

In either case, the switching frequency F can be easily set.

Embodiment 5

In embodiment 4, the switching frequency F is used so as to be temporally varied in the same manner among a plurality of converters DCk, whereas in the present embodiment 5, a different switching frequency F is used for at least one converter DCk.

Figure 15:
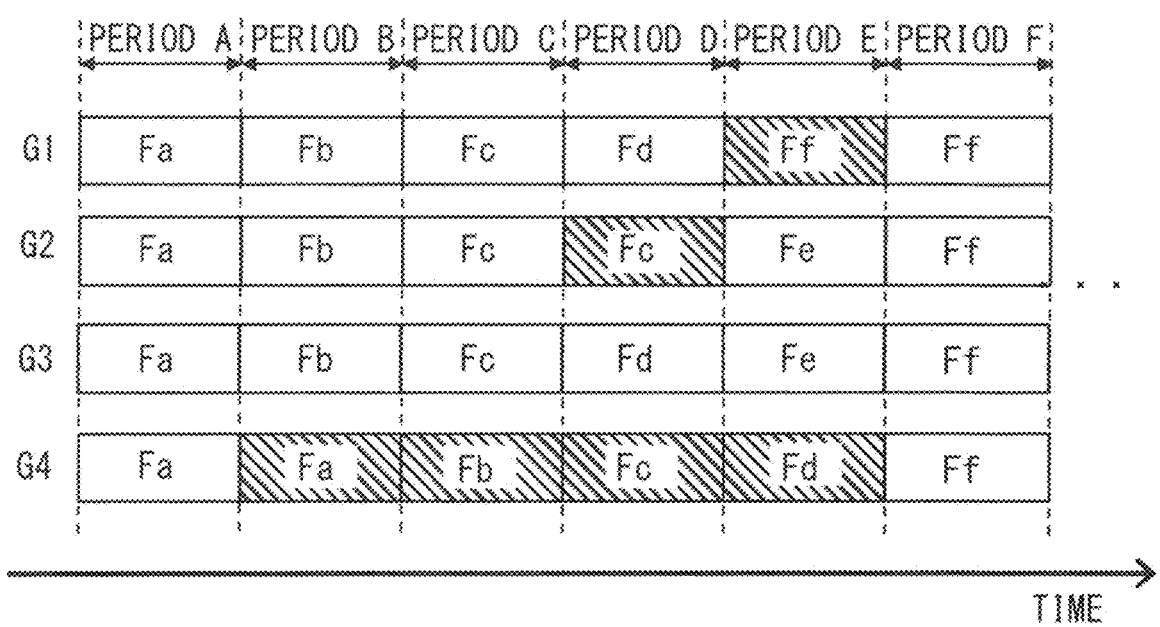
FIG. 15 illustrates switching frequencies of a DC/DC converter according to embodiment 5.

FIG. 15 illustrates switching frequencies of the DC/DC converters according to the present embodiment 5. In this case, the DC/DC converter 100 having four converters DCk connected in parallel is used.

As shown in FIG. 15, in the gate signals Gk (G1, G2, G3, G4) for the four converters DCk, the switching frequencies F are switched among a period A, a period B, a period C, a period D, a period E, and a period F. Also in this case, as shown in the above embodiment 4, a plurality of switching frequencies F are selected in the region Fw in which the total loss PSUM (=PQ+PL) is smaller than that in the frequency band A2. In addition, a frequency interval which is a difference frequency between the switching frequencies F before and after the switchover is limited, and the switching frequency F is switched with a frequency interval of 100 kHz or lower, for example.

In this case, five switching frequencies Fa, Fb, Fc, Fd, Fe, Ff (Fa<Fb<Fc<Fd<Fe<Ff) are used, and are switched as shown in FIG. 15. With reference to the gate signal G3 which is switched in order of Fa, Fb, Fc, Fd, Fe, Ff from the period A to the period F, the switching frequencies F differ in the period E of the gate signal G1, the period D of the gate signal G2, and the periods B to E of the gate signal G4.

Also in the present embodiment, the plurality of switching frequencies F are used in a temporally varied manner, whereby the amplitude ΔIA of the current IA which is the sum of the inductor currents ILk can be further reduced and noise components due to the switching frequencies F can be further distributed. In addition, since a different switching frequency F is used for at least one converter DCk, noise components can be distributed in a wider range, so that noise due to harmonic current based on switching can be further reduced.

The switching pattern shown in FIG. 15 is merely an example. As long as the switching frequencies F for the plurality of converters DCk can be prevented from being temporally varied with equal values, the switching frequencies F may be set optimally as appropriate in accordance with the generated noise level condition.

In the above embodiments 1 to 5, the DC/DC converter for on-vehicle application has been described. However, without limitation thereto, the above configurations can be applied to a case where a device that is used in a frequency band close to the switching frequency F used in the DC/DC converter and that needs to avoid noise interference, e.g., a household audio player or medical equipment, is placed around the DC/DC converter, whereby the same effects are obtained. In this case, the frequency band of the above device is set as the first non-selected frequency band.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 12, 12A, 12B controller
100, 100A, 100B DC/DC converter
B1 AM band
B2 non-selected band
Dk diode
DCk, DCak, DCbk converter
F switching frequency ILk inductor current
Lk inductor
PL, PLa loss in inductor
PQ loss in switching element
PSUM, PSUMa total loss
Qk switching element
Qg total gate charge
Sk switching element

The invention claimed is:

1. A DC/DC converter comprising:
N converters, wherein N is an integer more than 1, each having an inductor, a switching element, and a reverse-flow preventing element, the N converters being connected in parallel; and
a controller for performing switching control for the switching element of each of the N converters using a set switching frequency, to control the N converters,
wherein:
the controller controls the N converters at phases different from each other and such that a sum of the set switching frequencies is out of a predetermined first non-selected frequency band,
in each of the N converters, the inductor has an inductance that decreases as the set switching frequency increases, and total loss of loss in the inductor and loss in the switching element changes in accordance with the set switching frequency,
each switching element in the N converters is controlled using the set switching frequency set to be higher than a second non-selected frequency band of which upper and lower limit frequencies are 1/N of upper and lower limit frequencies of the first non-selected frequency band, respectively, and the switching element has a total gate charge such that the total loss is smaller than that in a case where the set switching frequency is set to be lower than the second non-selected frequency band, and
the set switching frequency for each of the converters is in the first non-selected frequency band.

2. The DC/DC converter according to claim 1, wherein: for the inductor of each of the N converters, the inductance is determined using, as a lower limit value, an inductance value determined by voltage applied to the inductor, a maximum ripple width, the set switching frequency, and a duty cycle, the maximum ripple width being determined by an average value and a limitation value of inductor current.

3. The DC/DC converter according to claim 2, wherein; the controller controls each of the N converters while temporally varying respective switching frequencies.

4. The DC/DC converter according to claim 3, wherein; the controller uses, for at least one of the respective switching frequencies, a frequency different from the other respective switching frequencies.

5. The DC/DC converter according to claim 2, wherein; the controller controls the N converters with respective switching frequencies set to be equal to each other and with respective phases set to be different from each other by 2π/N.

6. The DC/DC converter according to claim 2, wherein: the N converters are boost converters each of which boosts input DC voltage and outputs resultant voltage.

7. The DC/DC converter according to claim 2, wherein; the first non-selected frequency band is a band of amplitude modulation broadcast of a radio.

8. The DC/DC converter according to claim 1, wherein: the controller controls each of the N converters while temporally varying respective switching frequencies.

9. The DC/DC converter according to claim 8, wherein; the controller uses, for at least one of the respective switching frequencies, a frequency different from the other respective switching frequencies.

10. The DC/DC converter according to claim 8, wherein; the controller controls the N converters with respective switching frequencies set to be equal to each other and with respective phases set to be different from each other by 2π/N.

11. The DC/DC converter according to claim 1, wherein; the controller controls the N converters with respective switching frequencies set to be equal to each other and with respective phases set to be different from each other by 2π/N.

12. The DC/DC converter according to claim 1, wherein; the N converters are boost converters each of which boosts input DC voltage and outputs resultant voltage.

13. The DC/DC converter according to claim 1, wherein; the first non-selected frequency band is a band of amplitude modulation broadcast of a radio.

14. The DC/DC converter according to claim 1, wherein: the total gate charge of each switching element in the N converters is configured so that a frequency region, where the total loss is smaller than a minimum value in the frequency band lower than the second non-selected frequency band, is provided in the frequency band higher than the second non-selected frequency band,
the frequency region includes a center part of the first non-selected frequency band, and
the set switching frequency is set in the frequency region.

15. The DC/DC converter according to claim 14, wherein: for the inductor of each of the N converters, the inductance is determined using, as a lower limit value, an inductance value determined by voltage applied to the inductor, a maximum ripple width, the switching frequency, and a duty cycle, the maximum ripple width being determined by an average value and a limitation value of inductor current.

16. The DC/DC converter according to claim 14, wherein: the controller controls each of the N converters while temporally varying respective switching frequencies.

17. The DC/DC converter according to claim 16, wherein: the controller uses, for at least one of the respective switching frequencies, a frequency different from the other respective switching frequencies.

18. The DC/DC converter according to claim 14, wherein: the controller controls the N converters with respective switching frequencies set to be equal to each other and with respective phases set to be different from each other by 2π/N.

19. The DC/DC converter according to claim 14, wherein: the N converters are boost converters each of which boosts input DC voltage and outputs resultant voltage.

20. The DC/DC converter according to claim 14, wherein: the first non-selected frequency band is a band of amplitude modulation broadcast of a radio.

* * * * *